UNITED STATES PATENT OFFICE.

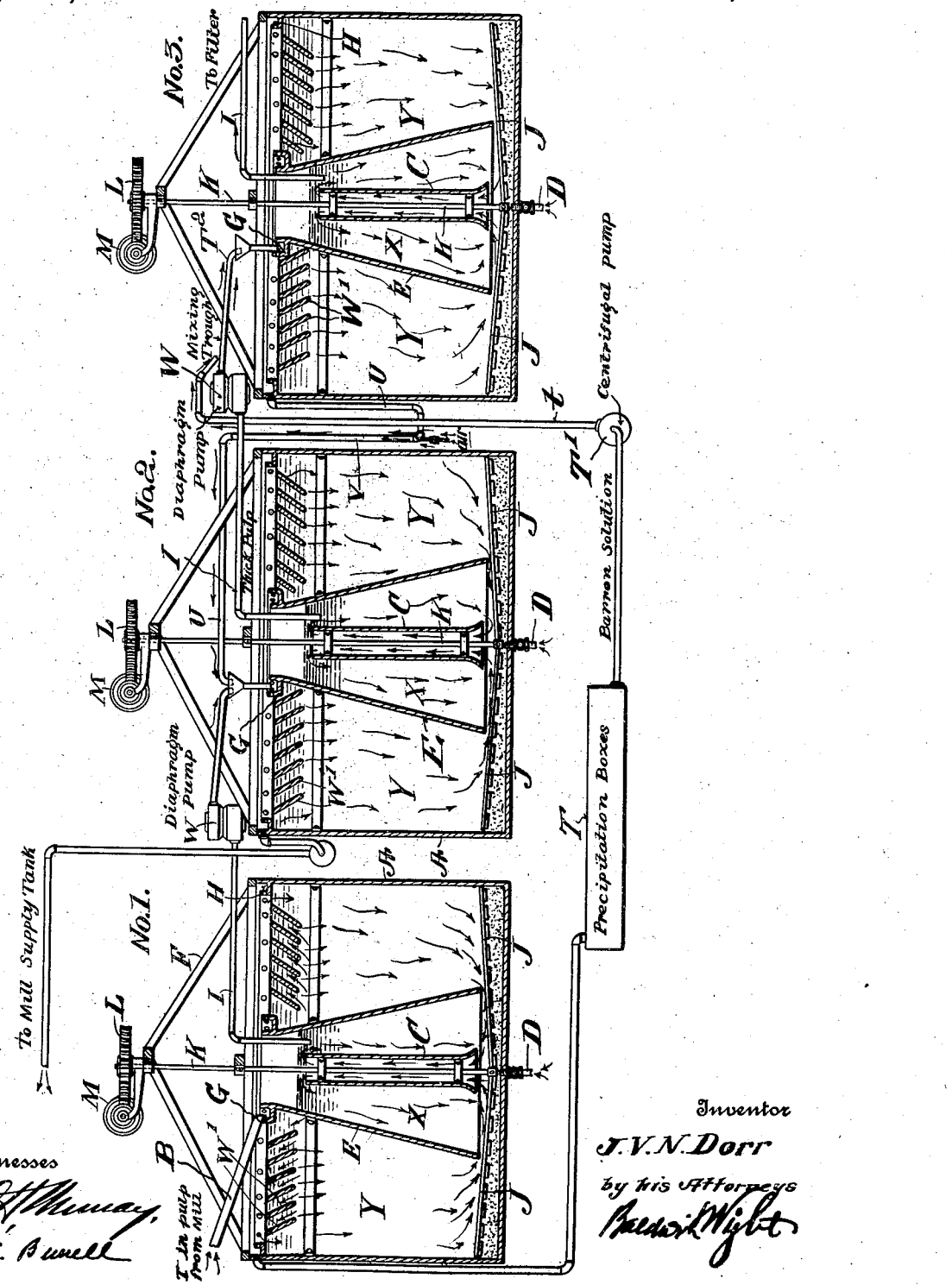

JOHN VAN NOSTRAND DORR, OF DENVER, COLORADO.

APPARATUS FOR THICKENING AND AGITATING PULP.

1,211,828. Specification of Letters Patent. Patented Jan. 9, 1917.

Original application filed September 9, 1912, Serial No. 719,465. Divided and this application filed June 26, 1913. Serial No. 775,884.

*To all whom it may concern:*

Be it known that I, JOHN VAN NOSTRAND DORR, a citizen of the United States, residing in Denver, in the county of Denver and State of Colorado, have invented certain new and useful Improvements in Apparatus for Thickening and Agitating Pulp, of which the following is a specification.

This invention relates to apparatus for dewatering and agitating solids suspended in liquids, such as ore pulp as it comes from the crushers or grinders.

In the treatment of any solid for the purpose of dissolving one or more of its constituents, as in the treatment of ore by the cyanid process, it is customary to remove by decantation a large part of the water or solution in which the ore is suspended as it comes from the grinding or pulverizing machines in order to reduce the pulp to the proper density for agitation or for filtration, and after such dewatering it is customary to agitate the thickened pulp until the dissolution of soluble material has been effected, the solvent liquor being then further treated to recover its values. Decantation and dilution are also used as means for recovering the dissolved constitutents after solution has taken place. Continuous decantation both ahead of and after agitation for the recovery of the dissolved values has now come into general use.

Heretofore the steps of decantation and agitation have been performed in separate vessels but I have provided apparatus by which they are carried on simultaneously and under the most favorable conditions resulting in economy in the first cost of the apparatus and in the expense of its maintenance.

In my application for Patent No. 719,465 filed September 9, 1912, of which the application for the present patent is a division, I have shown apparatus comprising a tank or container to which the thin pulp from the mill is delivered and which is provided with an outlet for the thickened pulp and an overflow for the clear liquor containing the values in solution. The solid particles of the pulp in such apparatus settle to the lower part of the container and means is provided for lifting the settled material to a higher level where it overflows and passes down to the lower part of the container and is again lifted, this operation being repeated until the desired dissolution is effected. The means for lifting the settled material as described in my beforementioned application preferably consists of what is known in this art as an "air-lift" and comprises a vertically arranged pipe or cylinder to the lower end of which air under pressure is delivered and which, as it rises, carries the settled material to the upper part of the container. In order to divide that part of the pulp being agitated from that part which slowly settles, a separator is provided which is preferably in the form of a truncated cone which surrounds the air-lift and provides a space down which the material being agitated passes to the mouth of the lifter.

In order to scour the settled material, to break up and remove insoluble matter from the particles thereof and to move the material into the field of action of the agitator, slowly revolving plows or scrapers are provided which operate on the settled material near the bottom of the container. Two or more cones or separators may be employed to provide a plurality of agitating spaces and a plurality of air-lifts may be used in connection with them.

According to my present invention, in order to effect the complete extraction of the values from the pulp, I provide a series of combined decanters and agitators of the kind described in my said application, which are so arranged that there is a period of agitation between each step of decantation so that the thickened product is exposed more frequently to the action of the solvent.

The accompanying drawing illustrates a series of combined thickeners and agitators connected for continuous work in accordance with my invention.

Each individual thickener and agitator shown in the drawing is substantially the same in construction as that shown in my before mentioned application and each comprises a container for the pulp under treatment in the form of a circular tank A in which the material under treatment settles. The tank has a substantially flat bottom in contradistinction to an abruptly tapered or cone-shaped bottom of the usual kind to which there are grave objections owing to the building up of the settled material thereon. The lifter for the settled material consists preferably of a vertically arranged pipe or cylinder C open at top and bottom, its lower end or mouth being a short distance above the bottom of the tank, while its upper end is in the upper portion thereof. Air is admitted to the mouth of the cylinder in any suitable way, as from a pipe D, leading to any suitable source of supply.

Surrounding the air-lift is a separator E, the function of which is to provide an agitating space X apart from the settling space Y. The separator is preferably in the form of a truncated cone suspended or supported in any suitable way. The upper end of the separator preferably carries the feed launder G from which the pulp flows to the surrounding space Y. The overflow launder for the clear liquor containing the values is indicated at H and the discharge for the thickened material is indicated at I.

In order to scour the settled material to break up and dislodge insoluble matter and to move the settled material toward the mouth of the lifter, I employ slowly revolving plows or scrapers J, comprising radial arms carrying flights so disposed as to move the material to the mouth of the lifter. The scraper arms may be arranged horizontally or substantially so, or may be inclined upwardly to some extent from their inner ends outwardly. These arms are attached to a vertical shaft K carrying a worm wheel L operated by a worm M. The material under treatment enters the feed launder G and passes therefrom to the settling area Y where the solid matter slowly descends while the clear liquor passes out through the overflow launder H. The settled material is moved slowly to the lower part of the container toward the lifter being thereby scoured and broken up while so moving. The air-lift causes the thickened material to rise in the lifter pipe C where it is thoroughly aerated and from the top of this pipe the material overflows and settles or descends in the agitating space X within the separator E. Many of the particles of the thickened pulp are repeatedly carried up through the lifter pipe and repeatedly descend in the agitating space being thus repeatedly subjected to the influence of the dissolving fluid, and this operation takes place without interference with quiet settling in the space Y surrounding the separator. The heavier particles descend more rapidly than the lighter ones and more frequently traverse the agitating and scouring fields, while the thickened material which is withdrawn passes through the discharge pipe I and is delivered for further treatment. These operations may be performed continuously,—the thin pulp from the mill being fed to the apparatus No. 1 at B, and the thickened and agitated pulp is discharged from the first apparatus at I. According to my invention the thickened and agitated material from one tank or container is conveyed to another and subjected to additional treatment in order to more fully recover the values from the solids. The drawings show a plurality of such combined thickeners and agitators connected in series for this purpose. The overflow of clear liquors from apparatus No. 1 passes to precipitation boxes T and the barren solution is forced by a pump T' through a pipe $t$ to the feed trough $T^2$ of apparatus No. 3. The thickened and agitated pulp from apparatus No. 1 is conveyed through pipe I to the feed launder of apparatus No. 2, while the overflowing clear liquor from apparatus No. 3 goes to the feed launder of apparatus No. 2, being conveyed by the pipe U. The thickened pulp from apparatus No. 2 goes to the feed launder of apparatus No. 3 through the pipe I and mixes with the barren solution from the precipitation boxes.

I have shown pumps T' and W for producing the transfer of thickened material and solution from one apparatus to another but this is not essential because if the apparatus were located on different levels, gravity might be depended upon to effect the transfer.

In each combined thickener and agitator shown, I have illustrated baffle plates W' arranged in the upper parts of the containers. These may be used to promote the settling operation but are not essential.

It is obvious that the apparatuses may be used for treating other material than ore pulp.

I claim as my invention:

Apparatus for thickening and agitating pulp, comprising a series of vessels each provided with a separator having on one side a chamber in which the pulp is agitated and on the other a space for quiet settling, means in said chamber for thoroughly agitating the thickened pulp, means connecting the agitating chamber of one vessel with the settling space of another, and means for conducting the clear liquid from one vessel to and mixing it with the thickened agitated pulp passing from the agitating chamber of another vessel in the series before said agitated pulp descends to another settling area.

In testimony whereof, I have hereunto subscribed my name.

JOHN VAN NOSTRAND DORR.

Witnesses:
PHIL. M. McHUGH,
H. W. SPICER.